F. L. MORSE.
MULTIPLATE DRIVE CHAIN.
APPLICATION FILED SEPT. 8, 1917.

1,352,017.

Patented Sept. 7, 1920.

INVENTOR
Frank L. Morse.
BY
Edward A. Wright.
ATTORNEY

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

MULTIPLATE DRIVE-CHAIN.

1,352,017.   Specification of Letters Patent.   Patented Sept. 7, 1920.

Application filed September 8, 1917. Serial No. 190,283.

*To all whom it may concern:*

Be it known that I, FRANK L. MORSE, a citizen of the United States, residing at Ithaca, in the county of Tompkins and State of New York, have invented a certain new and useful Improvement in Multiplate Drive-Chains, of which improvement the following is a specification.

This invention relates to drive chains of the multi-plate type in which each link is composed of a plurality of plates adapted to arch over the teeth of the sprocket wheel and engage the same on the edges of the link plates, the plates of adjacent links being preferably interspersed upon the pintles.

Drive chains of this type are now employed in large numbers for the transmission of power in both large and small units, and in some instances where chains operate at relatively high speed there is found to be an excessive amount of vibration of the chain, which causes unnecessary wear and increases the noise of operation, which is more or less objectionable.

The object of my present invention is to reduce or substantially eliminate this excessive vibration of the drive chain, whereby the action will be more steady and uniform thus increasing the efficiency and the life of the chain and eliminating the objectionable noise. My invention comprises an improved spring device for exerting a certain amount of frictional resistance between plates of the adjacent links where the same turn relatively to each other at the pintle joints. This may be accomplished in various ways, but according to a preferred construction I provide a spring link plate inserted in one or both of the adjacent links and exerting lateral pressure upon the plates to force the same to bear against each other with a certain amount of frictional resistance.

In the accompanying drawing,—

Figure 1:
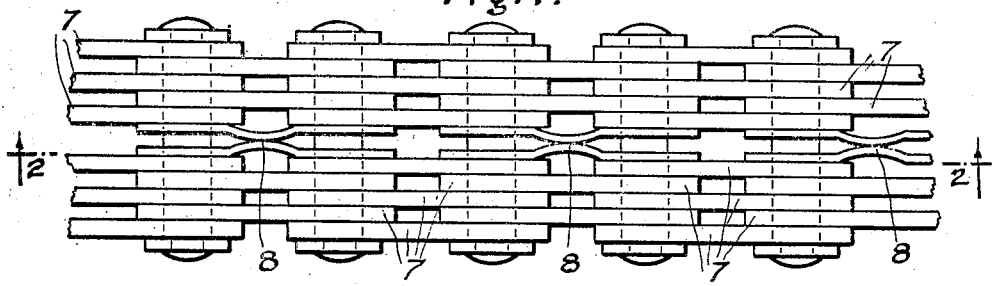
Figure 3:
Figure 4:
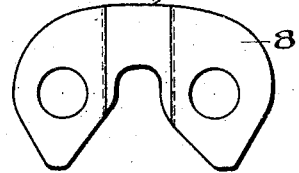
Figure 5:
Figure 6:
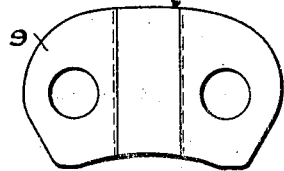
Figure 2:
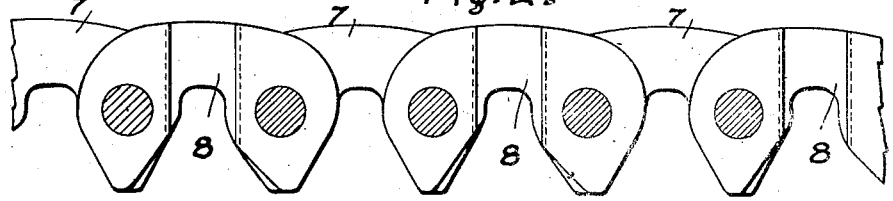

Figure 1 is a plan of a portion of a drive chain embodying my improvement;

Fig. 2 a vertical section taken on the line 2—2 of Fig. 1;

Figs. 3 and 4 a plan and side view of one form of spring link plate;

Figs. 5 and 6 corresponding views showing a spring guide link; and

Figure 7:
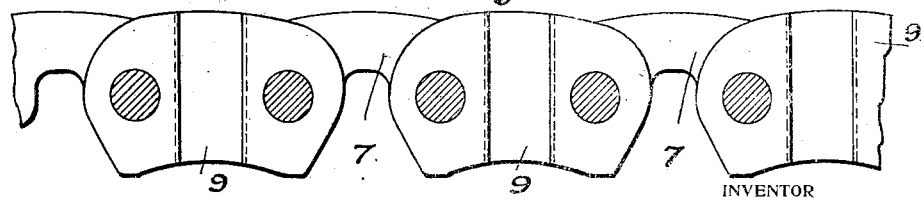

Fig. 7 a section similar to Fig. 2, but showing the spring link plates also serving as central guide links.

The links of the drive chain are shown as composed of a plurality of link plates 7, of the usual arch-shaped form adapted to extend over the teeth of a sprocket wheel, and interspersed upon the pintles with the plates of the adjacent links. According to my improvement a spring device is employed to exert lateral pressure upon the link plates and, as shown, one form of spring device for this purpose comprises a spring link plate 8, which may be formed of one or more bent leaves, inserted between two of the ordinary arch-shaped plates 7, of a link of the chain. Any desired number of such spring link plates may be inserted in a link, according to the width of the chain. The lateral pressure exerted by these spring plates creates a certain amount of frictional resistance to the flexing of the chain at the joints, whereby a steady uniform action of the chain is produced in passing on and off the sprocket wheels when running at high speed, and excessive vibration is thereby avoided.

The spring link plates may conform to the arch-shaped links as indicated at 8, Figs. 3 and 4, or they may be straight along the lower edge as indicated at 9, Figs. 5, 6 and 7, and also serve as guide links for engaging the usual longitudinal grooves in the sprocket wheels for guiding the chain thereon.

My improvement is applicable to various types of multi-plate drive chains and may comprise other forms of spring devices for forcing the link plates together laterally upon the pintles.

Having now described my invention, what I claim as new and desire to secure by Letters Patent is:

1. A multiplate drive chain having links comprising a plurality of plates interspersed with the plates of adjacent links, and spring means for exerting frictional resistance to the turning movement between adjacent links.

2. A multiplate drive chain having pintles and links comprising a plurality of plates interspersed upon the pintles with the plates of adjacent links, and a spring device for exerting lateral pressure upon the link plates.

3. A multiplate drive chain having pintles and links comprising a plurality of plates interspersed upon the pintles with the plates of adjacent links, and a spring link plate inserted between the plates of certain of the links for pressing the same laterally.

4. A multiplate drive chain having pintles and links comprising a plurality of plates interspersed upon the pintles with the plates of adjacent links, and a spring link plate formed of a plurality of leaves inserted between the plates of certain of the links.

5. A multiplate drive chain having pintles and links comprising a plurality of plates interspersed upon the pintles with the plates of adjacent links, and a spring link plate mounted upon the pintles between certain of the link plates for exerting a lateral pressure upon the same.

6. A multiplate drive chain having pintles and links comprising a plurality of arch-shaped plates interspersed upon the pintles with plates of adjacent links, and a spring guide link plate for exerting lateral pressure upon certain of the link plates and having a projecting lower edge for engaging a grooved sprocket wheel.

In testimony whereof I have hereunto set my hand.

FRANK L. MORSE.